Patented Oct. 29, 1935

2,019,349

UNITED STATES PATENT OFFICE 2,019,349

SYNTHETIC RESIN

Richard Daniel Kleeman, Schenectady, N. Y., assignor to General Electric Company, a corporation of New York No Drawing. Application May 12, 1930,
Serial No. 451,845

5 Claims. (Cl. 134—26)

This invention relates to synthetic resins, and more particularly to synthetic resins formed by the interreaction of polyhydric alcohols and polybasic acids with or without other reacting ingredients, which type of resins are also known as alkyd resins. The most common example of an alkyd resin is that produced by the interreaction of phthalic anhydride and glycerine. The present invention is more especially concerned with the production of aqueous colloidal suspensions of such resins.

Heretofore it has been found impossible to produce either a colloidal solution or suspension of an alkyd resin in water. This difficulty has been due to the fact that the resin could not, prior to the present invention, be obtained in sufficiently fine particle form by either mechanical, electrical or chemical means to go into or remain in colloidal suspension. While the B-stage product is soluble in various organic solvents and such solutions find various industrial applications, it has often been necessary to dispense with the use of such solutions because of the objectionable features which attend the use of organic solvents. For example, the odor and fire hazard attendant to the use of certain organic solvents with which the resins are compatible coupled with the loss of such solvents during the industrial operations have made the use of the resin impracticable in certain cases. It is obvious therefore that an aqueous colloidal solution or suspension of the resin, if it can be conveniently prepared and easily and successfully used, is highly advantageous.

I have discovered a method whereby I may obtain an aqueous colloidal suspension of an alkyd resin which is practically permanent in its nature and wherein the resin is unattacked by the water.

In order to illustrate my invention so that it may be carried out by those skilled in the art to which it pertains, I shall describe it and its various aspects more in detail and point out its scope in the appended claims.

Any alkyd resin may be employed. For example, a resin such as that obtained by the interreaction of glycerine and phthalic anhydride in reacting proportions such as prepared according to the method outlined in the Callahan Patent 1,108,329, which resin is in the B-stage, may conveniently be used. The resin is ground into a powder and put through a sieve so that the larger particles are about the size of sand. This is done so that the largest particles are of the same size, since the time it takes a particle to be transformed into a colloidal suspension depends on its size.

The finely powdered resin is mixed with an amount of plastic clay, for example natural $H_2Al_2(SiO_4)_2.H_2O$. The amount of clay needed is immaterial provided it is not too small. For example, 10 percent of the weight of the resin used and even less may be employed. Water is added to the mixture and it is stirred until a pasty mass is obtained. In order to have the clay in the form of very fine particles, instead of proceeding as above, the clay may be suspended in water and the suspension allowed to stand, preferably with occasional stirring, for a short period of time, for example, about an hour, so as to enable the larger particles to form into smaller ones. This suspension is then added to the powdered resin. The water content should be such that a mass of the consistency of cream is obtained. On heating to the boiling point while stirring rapidly the resin gradually goes into solution and then into fine suspension, all of which occurs most rapidly when a certain density has been reached due to the evaporation of water, and eventually a white, homogeneous, creamy mass is obtained. This density will be apparent when reached and is indicated by the great rapidity with which the resin goes into solution and is maintained by the addition of water, preferably warm water, for a few minutes, after which the suspension is ready for use when it may be diluted to any extent with water. A vessel made of aluminum has been found to be better than any other because no caking on its surface takes place. The object of maintaining the mixture at a certain density is that if the density is allowed to increase much beyond that, the mixture assumes a gummy state after which it is difficult to dissolve in water. It will be found that the resin goes completely into colloidal suspension, no residue being left and no caking taking place at the bottom of the vessel when it consists of aluminum. When the mass is heated under pressure greater than atmospheric pressure the resin appears to go into solution more rapidly.

The process is independent of the fineness of the particles of the ground resin except that they go into solution more rapidly the finer they are. While I do not wish to be limited by the following explanation, it is my theory that the clay acts as a catalytic agent under the action of which the resin goes into chemical supersaturated solution first, from which solution it is then precipitated in the form of fine colloidal particles. The amount of clay does not seem to matter except that the process is to a certain extent more rapid the larger the amount of clay used. That is, the amount of clay used influences only the rapidity with which the resin goes into colloidal suspension. The fineness of the colloidal particles depends on the nature of the clay employed. For example, if china clay is used the mixture may be thinned to any extent by the addition of water, yielding a creamy or milky mixture of any desired consistency; on the other hand, if a more plastic clay is used such as a rich ball clay, the mixture obtained possesses great stickiness like dissolved rubber, and is more difficult to thin out.

The colloidal suspension of the alkyd resin may be used wherever an organic solution of the resin is used, and in addition, has a wide field of application. For example, it may be used as a coating medium to coat various objects either for adhesive, ornamental or insulating purposes. It may also be used in molding various articles.

One field of application where it may be used to great advantage is as an adhesive in making mica products. In present processes for making laminated mica products for insulating purposes usually an organic solution of an alkyd resin is employed, the solution being sprayed in a suitable manner on sheets of mica and after evaporation of the solvent, which is usually lost, the product is cured to convert the resin to the final infusible, insoluble state. In using the aqueous colloidal suspension of the resin in the manufacture of a laminated mica product a relatively thin suspension may be applied on the mica sheets. The sheets are preferably dried before curing using a temperature such that no ebullition takes place and no bubbles of steam form. The drying may be carried out at a temperature a little below 100° C. or at room temperature in which case the drying time is increased, or in a partial vacuum where the temperature should not be high enough to produce ebullition. The mica sheet comes out as a hard and compact product under these conditions. This is due to the fact that the interstices of the sheet are filled entirely with the colloidal solution before the final state is reached and therefore as the process of drying goes on the effect of the surface tension of the water combined with atmospheric pressure is to force the mica flakes together and securely bond them. The sheets may now be cured in any manner well known to the art and the finished product is exceptionally strong and durable.

If desired, the mica may first be ground and mixed well with the aqueous colloidal suspension of the alkyd resin to produce a kneadable mass which may be rolled into slabs of desired thickness. After suitably drying such slabs they may be cured in any well known manner to produce sheets of insulating material. It is possible to aid drying by adding a substance which combines with the water such, for example, as plaster of Paris, cement and the like.

The colloidal suspension of the resin with or without suitable fillers, dyes and the like, may be employed to coat metal surfaces by using any well known means of applying the resin as, for example, by dipping, spraying, brushing and the like. The coat is first air-dried then cured at the proper temperature.

In some cases it is advantageous to heat the metal surfaces above 100° C. and then momentarily plunge the article into the colloidal suspension of the resin. In such case the surface comes out with a homogeneous fused layer of resin which is probably partially cured. If the curing temperature is unusually high the surface of the coating remains rough since the resin particles harden before they have a chance to fuse and spread very much. This is an advantage when more than one coat is applied in succession. On the other hand, when the curing temperature is gradually raised a smooth surface is obtained. A single coat of any desired thickness may be successfully applied provided the curing is carried out sufficiently slow. Actual tests have shown that the coats of resin on the metal produced by means of the present invention, using an aqueous colloidal solution or suspension of the alkyd resin, adhere tenaciously to the metal and will not break or loosen by repeated bending.

A colored aqueous colloidal suspension of the resin produced by adding suitable coloring materials thereto may be successfully and advantageously used as a means of imparting colored surfaces to lamps, tubes, bulbs and the like, or in producing colored panes of glass. The heat of the lamp if sufficient, may be used to cure the resin or the latter may be cured in any well-known manner, and when properly cured the coating is not attacked by water.

In using the aqueous suspension of the resin to produce molded articles it is first mixed with the material employed as, for example, fillers such as asbestos, fibrous materials, wood flour, ground mineral, talc, powdered mica and the like, the mass allowed to become almost dry, then pulverized, molded under heat and pressure and subsequently cured at the proper temperature, usually 150–200° C. if such subsequent curing is necessary. When a rich ball clay has been used in the process of preparing the aqueous colloidal suspension the paste obtained may be kneaded together with powdered or fibrous fillers and various articles such as buttons, knobs, discs and the like stamped out of the mass after which the articles may be cured in any well known manner.

It is to be observed that the process described is applicable to the production of an aqueous colloidal suspension of alkyd resins whether modified or unmodified. For example, alkyd resins modified during preparation by the addition of acids derived from drying or semi-drying oils or the oils themselves are comprehended within the scope of the present invention. It is also to be noted that the invention is not confined to the particular types of clay mentioned. Other types may also be used and are comprehended within the scope of this invention. It is to be observed, however, that those clays which possess medium plasticity have been found most satisfactory. For example, very satisfactory results have been obtained with an unmodified alkyd resin using Florida clay and also excellent results have been obtained with an alkyd resin modified by the addition of acids derived from drying oils by using a very plastic clay, such as the German or English ball clays.

The advantages of the aqueous colloidal suspension of the alkyd resin over an organic solution of the resin are manifest and numerous. Water is cheap and readily available. There is no fire hazard as with organic chemicals. There are no disagreeable odors to bother workers and those handling the products. The suspension is easy to use and conveniently prepared by a simple process. By eliminating the use of organic solvents there is a corresponding elimination of loss of expensive solvent in manufacture of products from alkyd resins, where organic solutions of the latter have heretofore been employed.

What I claim as new and desire to obtain by Letters Patent of the United States is as follows:

1. The method of obtaining an aqueous colloidal suspension of an alkyd resin which comprises heating in an aqueous medium an alkyd resin which has not been converted to the final infusible, insoluble form in the presence of clay.

2. The method of obtaining an aqueous colloidal suspension of an alkyd resin which comprises reducing said resin to the powdered state, mixing therewith a small proportion of clay, adding water to said mixture and heating with rapid stirring to the boiling point until a colloidal suspension forms.

3. The method of obtaining a stable aqueous colloidal suspension of an alkyd resin in the form wherein it may be subsequently converted to the final infusible, insoluble state, which comprises heating said resin in the B-stage in the presence of clay and water at a temperature of about 100° C. until the resin is completely converted to the colloidal state.

4. The method of preparing a stable aqueous colloidal suspension of an alkyd resin which comprises finely comminuting said resin before it is in the final infusible insoluble state, adding thereto in an aluminum vessel clay up to approximately 10% by weight of the resin employed, adding water thereto, stirring until a pasty mass is obtained, and heating the mass to the boiling point while stirring rapidly until a colloidal suspension forms.

5. The method of preparing a stable aqueous colloidal suspension of an alkyd resin which comprises suspending clay in water for a period of time sufficient to convert the particles thereof to a finely divided state, comminuting an alkyd resin to a fine state, adding the clay suspension to the powdered resin employing a water content such that a mass of the consistency of cream is obtained, heating the creamy mass to the boiling point while stirring rapidly, until a colloidal suspension results.

RICHARD DANIEL KLEEMAN.